United States Patent [19]

Watanabe et al.

[11] Patent Number: 4,816,858
[45] Date of Patent: Mar. 28, 1989

[54] AUTOMATIC FOCUSING CAMERAS

[75] Inventors: Youji Watanabe, Sagamihara; Minoru Matsuzaki; Junichi Itoh, both of Hachioji, all of Japan

[73] Assignee: Olympus Optical Co., Ltd., Japan

[21] Appl. No.: 156,999

[22] Filed: Feb. 17, 1988

[30] Foreign Application Priority Data

Feb. 24, 1987 [JP] Japan .................. 62-42074

[51] Int. Cl.$^4$ .............................................. G03B 3/00
[52] U.S. Cl. .............................. 354/400; 354/402; 354/195.1
[58] Field of Search ............... 354/400, 401, 402, 403, 354/404, 405, 406, 407, 408, 409, 195.1

[56] References Cited

U.S. PATENT DOCUMENTS

| 4,295,715 | 10/1981 | Breen | 354/400 |
|---|---|---|---|
| 4,474,447 | 10/1984 | Kawabata et al. | 354/406 |
| 4,557,577 | 12/1985 | Shinoda | 354/402 |
| 4,702,584 | 10/1987 | Taniguchi et al. | 354/400 |
| 4,730,201 | 3/1988 | Sasagaki | 354/400 |

FOREIGN PATENT DOCUMENTS 0001024  1/1981  Japan .

Primary Examiner—Russell E. Adams
Attorney, Agent, or Firm—Louis Weinstein

[57] ABSTRACT

An automatic focusing camera, after determining composition of an object being photographed within a range finding frame disposed at the center of a finder, repeats operations of detecting a range difference between an image forming position and a predetermined focusing position of the object and of storing the detected range difference, before a shutter release button is half-depressed, and, after being half-depressed, drives a taking lens in accordance with a range difference based on the latest information stored immediately before the half-depression to stop the taking lens at the predetermined focusing position, thereby enabling the lens setting without a time lag even when the object being photographed is in a low brightness.

26 Claims, 8 Drawing Sheets

AUTOMATIC FOCUSING CAMERAS

BACKGROUND OF THE INVENTION

The present invention relates to an automatic focusing camera, and more particularly, to an automatic focusing camera of the lens interchangeable type which detects a difference in range between an image forming position and a predetermined focusing position of an object being photographed to drive a taking lens to the predetermined focusing position in response to the detected range difference.

In the past, a variety of automatic focusing cameras in which, when a shutter release button is softly half-depressed, an operation of detecting a range difference between an image forming position and a predetermined focusing position is initiated and a taking lens is driven to a focusing position in response to a detected output have been disclosed in Japanese Laid Open patent application Sho No. 56-1024 and others. With such an automatic focusing camera, a photographer directs it to an object being photographed and an automatic focusing operation is not initiated until a release button is intentionally half-depressed, so that the camera operation is simple and an automatic focusing operation is scarcely effected to an uninterested object.

In addition, most of such automatic focusing cameras of the lens interchangeable type employ a storage type photoelectric transducer such as a line image sensor employing a CCD (charge coupled device) as a detector for a range difference. The storage type photoelectric transducer can detect a range difference by light rays from an object being photographed which pass through a taking lens, so that it is suitable for mounting an automatic focusing apparatus on a single lens reflex camera of the lens interchangeable type.

However, the storage type photoelectric transducer, whose dynamic range to an amount of light is limited, is unsuitable under all photographable brightness conditions and therefore its storing time should be adjusted in accordance with the brightness of an object being photographed. As a result, the storing time for an object being photographed in a low brightness is increased and the time for detecting a range difference is consumed so much. Accordingly, in an automatic focusing camera of the conventional type in which the automatic focusing operation is not initiated until a release button is half-depressed, a time lag may be caused by hundreds (MS), when an object being photographed is in a low brightness, until a taking lens is set after a release button has been half depressed. The time lag is felt to be very long to a photographer to make him irritated.

On the other hand, with such an automatic focusing Camera, it is not to take a picture in a focused condition until a release button is half-depressed after an object being photographed has been positioned in a range finding frame centered in a view finder. Accordingly, a photographer is cautious in effecting the above stated operations, so that a time lag may be caused until a release button is half-depressed after a desired object to be photographed has been positioned within the range finding frame. The time lag will be greater than an estimated time and also a time required for detecting a range difference even with an object being photographed in a comparatively reduced brightness. Consequently, if the detection of a range difference can be repeatedly operated before a release button is half-depressed, it is possible to eliminate a time lag from half-depression of a release button to a lens focusing operation.

SUMMARY OF THE INVENTION

It is an object of the present invention to provide an automatic focusing camera in which a lens focusing operation is initiated without a time lag in response to a half-depression of a shutter release button even with an object being photographed in a low brightness.

According to the present invention, since the operation of detecting a range difference has been completed before a release button is half-depressed after an image of a desired object being photographed has been positioned by a photographer within a range finding frame centered in a view finder, a lens driving operation is initiated immediately after the release button has been half-depressed.

Accordingly, the automatic focusing operation can be very rapidly and satisfactorily effected even with an object being photographed in a low brightness, without awaiting completion of a range finding operation such as an integration in a CCD line sensor as in a conventional camera of the same kind.

DETAILED DESCRIPTION OF PREFERRED EMBODIMENTS

Figure 1:
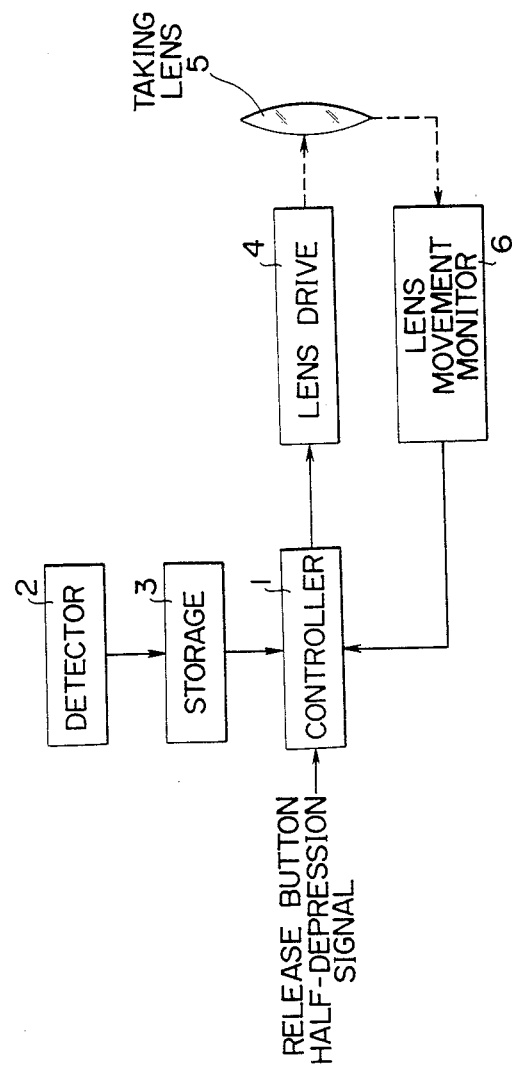
FIG. 1 is a general block diagram of an automatic focusing camera according to the present invention.

In FIG. 1, an automatic focusing camera comprises detector 2 for detecting an output produced by photoelectrically transforming an image of an object being photographed with: a photoelectric transducer composed of minutely divided photosensitive elements or an output of an object range such as a range difference between an image forming position and a predetermined position of the object on the basis of the photoelectrically transformed output;

storage 3 for storing the photoelectrically transformed output or the object range output;

lens driver 4 for focusing a taking lens 5 by means of a motor drive in accordance with a value stored in the storage;

lens movement monitor 6 for monitoring movement of the lens 5 while in operation of the lens driver; and controller 1 for controlling the lens 5 such that before a shutter release button is half-depressed the detector 2 and the storage 3 are repeatedly operated and when the release button is half-depressed the lens 5 is driven in accordance with a value stored in the storage 3 immediately before the half-depression to stop the lens 5 in the expected focusing position in response to the monitored result of the lens movement monitor 6.

In the automatic focusing camera, an image of an object being photographed is positioned within a range finding frame to determine composition of a picture and the photoelectrically transformed output or range data are repeatedly detected by means of the detector 2 before a shutter release button is half-depressed and stored in the storage 3 whenever being detected. When the release button is half-depressed, the controller 1 delivers a control signal for moving the lens 5 to a predetermined focusing position to the lens driver 4 in accordance with the latest value stored within the storage 3. The movement of the lens 5 is monitored by the lens monitor 6 and when the monitor 6 detects the fact that the lens 5 reached the predetermined focusing position, the controller 1 delivers a signal for stopping the lens 5 to the lens driver 4.

An embodiment of the present invention will be described hereinafter with reference to FIGS. 2 to 6.

Figure 2:
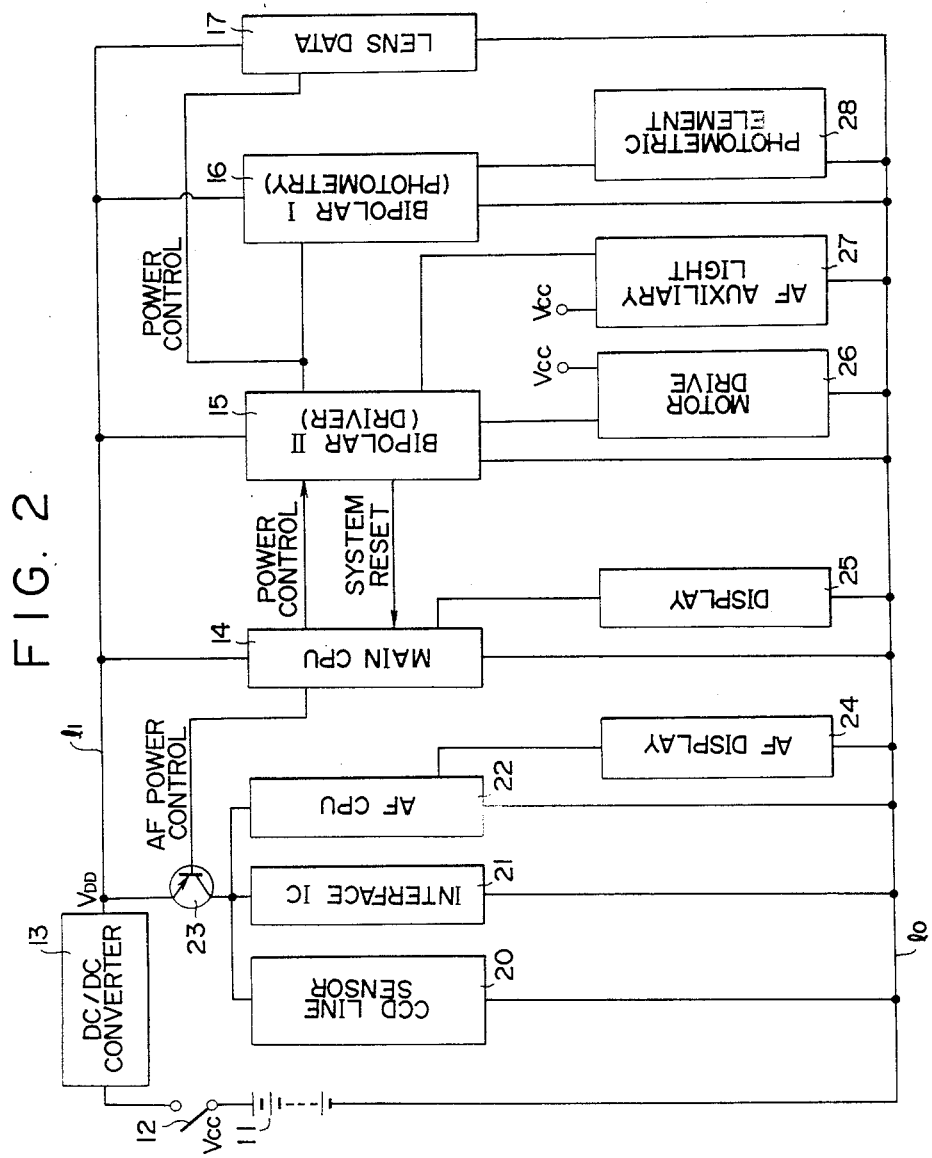
FIG. 2 is a block diagram of an electric circuit of an embodiment of an automatic focusing camera according of the present invention including its power supply.

In FIG. 2, a voltage Vcc of a battery source 11 is boosted by a DC/DC converter 13 when a power switch 12 is closed and a constant voltage VDD is applied between lines lo and 11. A MAINCPU 14, bipolar II circuit 15, bipolar I circuit 16, and lens data circuit 17 are connected between the lines lo and 11. A power supply control of the bipolar II circuit 15 and the bipolar I circuit 16 to the lens data circuit 17 is effected by a signal from a power control circuit of the MAINCPU 14 and power supply controls of the bipolar I circuit 16 and the lens data circuit 17 are effected by a signal from a power control signal from the bipolar II circuit 15.

A CCD line sensor 20 receives light from an object being photographed through the taking lens 5 on a light receiving plane including an array of minutely divided photodiodes. A photocurrent produced in the array of photodiodes is integrated. The integrated values are sequentially delivered from a CCD shift register (not shown in FIG. 2.) as a time-series signal. An interface IC 21 converts the integrated output to a digital value to deliver it to an AFCPU 22.

The automatic focusing circuit comprising the CCD line sensor 20, interface IC 21 and AFCPU 22 is connected through a transistor 23 for power control between the lines lo and 11. A power supply control of the automatic focusing circuit is effected by turning the transistor 23 on and off with a signal from a power control circuit for automatic focusing of the MAINCPU 14. The AFCPU 22 is a central processor unit for performing auto-focusing algorithm and is connected to an auto-focus (AF) display circuit of in-and out-of-focus. The MAINCPU 14 is a central processor unit for controlling a sequence of all camera operations such as a film winding, rewinding and exposure and is connected to a display circuit 25 for displaying others than the in-focus display. The bipolar II circuit 15 includes a variety of drivers required for a sequence of camera operations such as control for a film winding and rewinding motor and control for lens drive and shutter and is connected to a motor drive circuit 26 and an autofocus (AF) auxiliary light circuit 27 and the like. The bipolar I circuit 16 is mainly a circuit for photometric operation and includes a photometric element 28. The lens data circuit 17 stores lens data proper to individual interchangeable lens which are required for control of camera operations such as an automatic focusing, photometry and the like. Of lens data stored in the lens data circuit 17, a lens variable power coefficient zoom coefficient), macro identification signal, absolute range coefficients a, b, auto-focusing accuracy threshold Eth, lens rotating direction, fully open F value and the like are required in an automatic focusing operation.

The bipolar II circuit 15 observes status of the power voltage VDD and delivers a system reset signal to the MAINCPU 14 when the power voltage is less than a given voltage to cut off the power supply to the bipolar II circuit 15 through lens data circuit 17 and the automatic focusing circuit. The power supply to the MAINCPU 14 is retained even in a voltage less than the given one.

Figure 3:
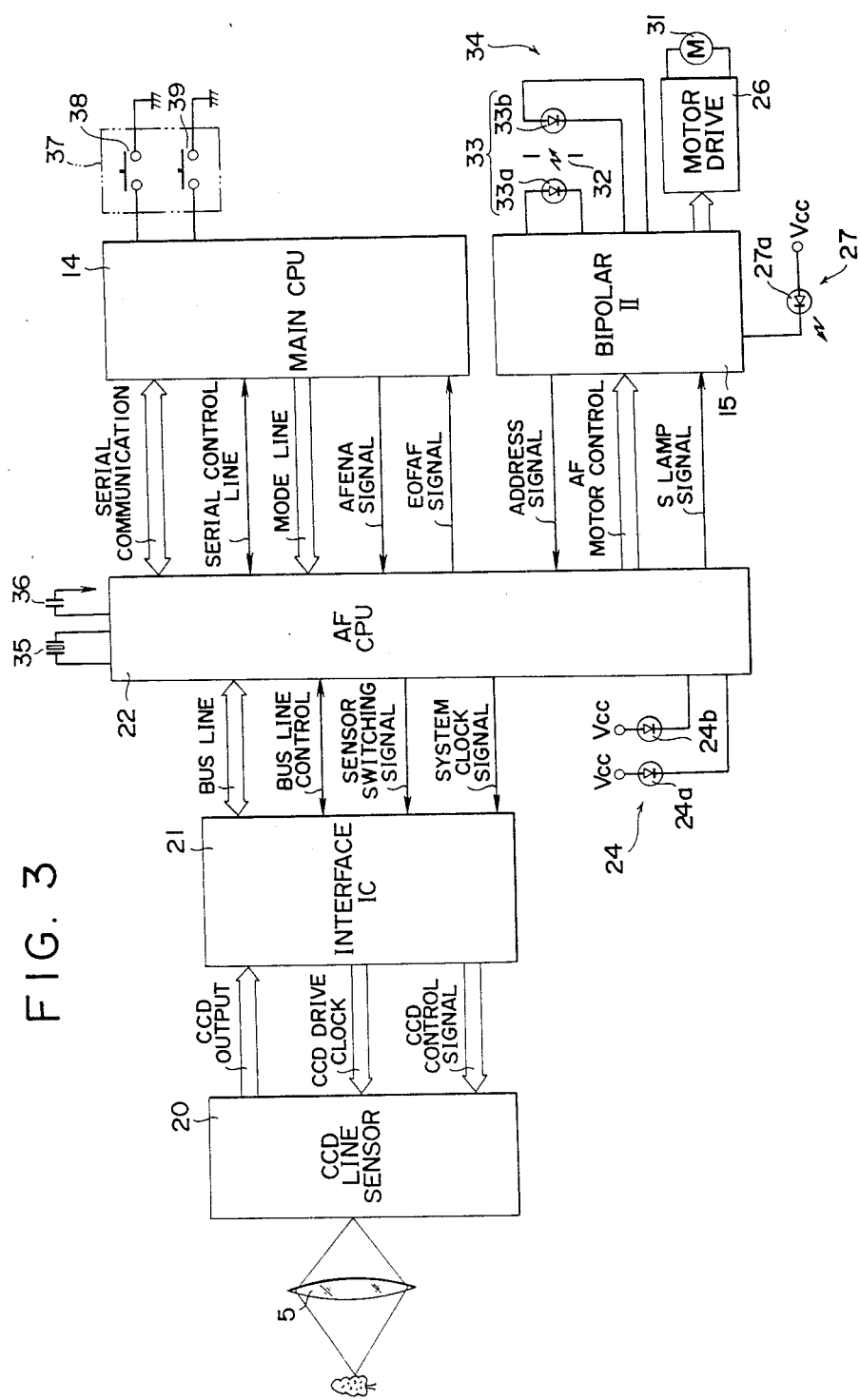
FIG. 3 is a schematic block diagram illustrating transfer Of signals in an automatic focusing circuit shown in FIG. 2.

In FIG. 3, data transfer between the AFCPU 22 and the MAINCPU 14 are effected with a serial communication line. The direction of the communication is controlled by a serial control line. Contents of the communication are lens data proper to an interchangeable lens. Information of each camera mode (auto-focus, single mode or other modes) given from the MAINCPU 14 to the AFCPU 22 is decoded through a mode line. In addition, a first release switch 38 which is closed by a half-depression of a shutter release button 37 (a first stroke depression) and a second release switch 39 which is closed by full-depression of the shutter release button 37 (a second stroke depression are connected to the MAINCPU 14.

An AFENA (auto-focus enabling) signal from the MAINCPU 14 to the AFCPU 22 is outputted in response to the half-depression of the shutter release button. The AFENA signal controls start and stop of the automatic focusing operation.

An EOFAF (end of auto-focus) signal from the AFCPU 22 to the MAINCPU 14 is delivered when the automatic focusing operation is completed and allows an exposure sequence to start when the second release switch 38 is closed.

The bipolar II circuit 15 decodes a signal of an AF motor control line from the AFCPU 22 to drive the motor drive circuit 26. When a lens drive motor 31 is driven by an output of the motor drive circuit 26, slits 32 equidistantly provided on a rotary member of a lens barrel rotates such that a photo-interrupter 33 in which a light emitter 33a and a receiver 33b are facing each other with the passage of the slit(s) 32 between count the number of the slits.

Namely, the slit 32 and photo-interrupter 33 constitute an address generator 34 and an address signal generated therefrom [a count signal of the slit(s) 32] shaped in waveform to be fed into the AFCPU 22.

A sub-lamp (hereinafter referred to as an S lamp) signal fed into the bipolar II circuit 15 from the AFCPU 22 controls an AF auxiliary light circuit 27 to light the S lamp 27a when an object being photographed is in a low brightness.

An AF display circuit 24 connected to the AFCPU 22 comprises an LED(light emitting diode) 24a for displaying OK in focusing which is lighted when focused and an LED 24b for displaying being unable to focus which is lighted when failing to focus.

A clock generator 35 and a reset capacitor 36 are connected to the AFCPU 22.

Data transfer between the AFCPU 22 and the interface IC 21 is effected through a bus line and a direction of the transfer is controlled by a bus line control signal.

A sensor switching signal and a system clock signal are fed from the AFCPU 22 to the interface IC 21. The interface IC 21 delivers a CCD drive clock signal and a CCD control signal, for example, to the CCD line sensor 20 and reads out a CCD output from the CCD line sensor 20. The interface IC 21 converts the CCD output from an analog value to a digital one to feed it into the AFCPU 22.

Operations of the embodiment shown above will be described hereinafter with reference to flow charts shown in FIGS. 4 to 6.

Figure 4:
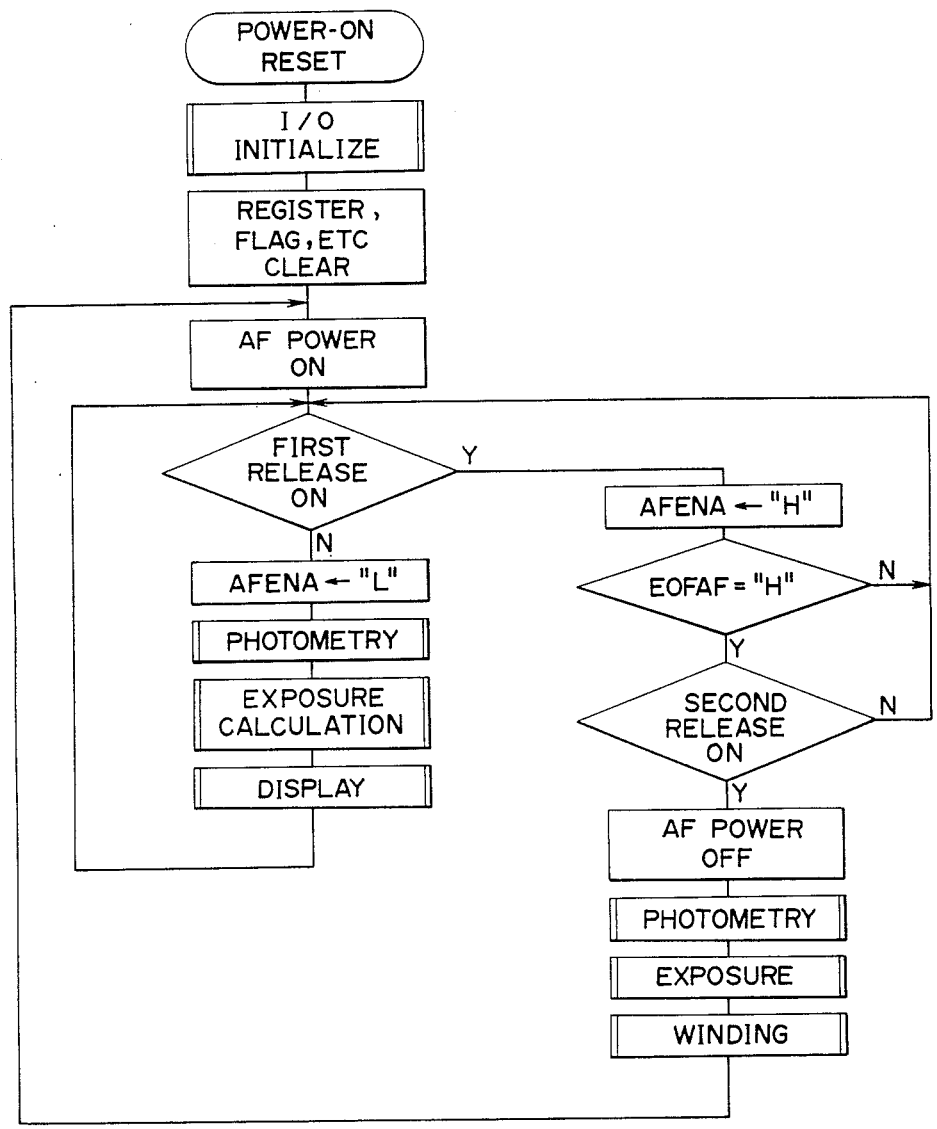
FIG. 4 is a flow chart illustrating programmed operations of the MAINCPU shown in FIG. 3.

When a power supply switch 12 is closed, the MAINCPU 14 first initiates a main routine of <POWER ON SET> shown in FIG. 4 to effect programmed operations from a zero address. Upon I/O initialization, registers, flags and the like are cleared. Thereafter, a power control circuit for automatic focusing in the MAINCPU 14 turns on to turn the transistor 23 on. Thus, power is supplied to the automatic focusing circuit comprising the CCD line sensor 20, interface IC 21 and AFCPU 22. After power is supplied to the automatic focusing circuit, it is checked whether the first release switch 38 for automatic focusing is turned on. When the first release switch 38 remains off, an AFENA signal is rendered "LOW" (hereinafter referred to as "L") and the flow again returns through subroutines of <PHOTOMETRY>, <EXPOSURE CALCULATION> and <DISPLAY> to check the of status of the first release switch 38. Namely, as long as the release button 37 is not half-depressed with the taking lens 5 directed to an object being photographed, the flow operations of the above routines are repeated to obtain the latest exposure value in accordance with a light beam from the object and thus a proper shutter speed and aperture are displayed.

When the first release switch 38 turns on by half-depressing the release button 37, the MAINCPU 14 makes an AFENA signal "High" (hereinafter referred to as "H") to allow the taking lens to be driven for automatic focusing. Thereafter, the MAINCPU 14 checks status of an EOFAF signal. As will be described later, when the automatic focusing is operated under control of the AFCPU 22 and an in-focus condition is obtained, the EOFAF signal becomes "H". After receiving the EOFAF signal in "H", the MAINCPU 14 checks status of the second release switch 39.

When the second release switch 39 turns on by full-depression of the release button 37, the power control circuit for automatic focusing operation turns off and thereby the MAINCPU 14 turns the transistor 23 off. As a result the power supplied, to the automatic focusing circuit comprising the CCD line sensor 20, interface IC 21 and AFCPU 22 is interrupted. After subroutines of <PHOTOMETRY>, <EXPOSURE> and <WINDING> are operated the flow again returns to turn the power control circuit on to repeat the above described flow diagram operations.

Figure 5:
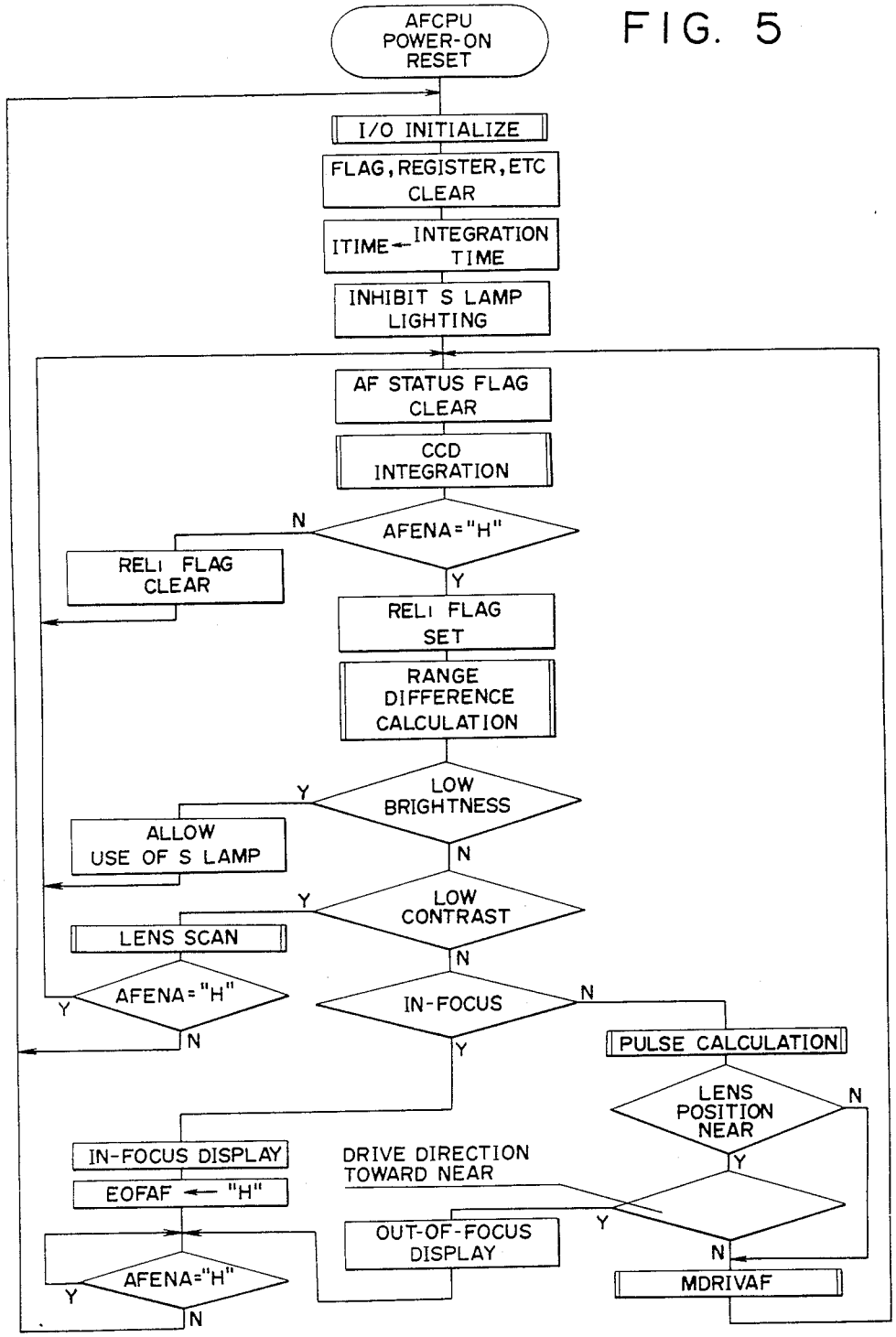
FIG. 5 is a flow chart illustrating an example of programmed operations of the AFCPU shown in FIG. 3.

When the power control for AF circuit of the MAINCPU 14 is activated, the transistor 23 turns on to apply the power supply voltage VDD to the automatic focusing circuit, and thereby the AFCPU 22 initiates a routine of <AFCPU POWER ON RESET> shown in FIG. 5.

Upon initiation of the <AFCPU POWER ON RESET> routine, a drive circuit in the automatic focusing circuit is first initialized in an <I/O INITIALIZE> subroutine. Specifically, the AF display circuit 24, motor drive circuit 26 and AF auxiliary light circuit 27 turn off and the serial communication line between the AFCPU 22 and MAINCPU 14 is initialized.

Next, a control flag and a register are cleared and thereafter a maximum value of CCD integration time is set into an ITIME register such that the CCD integration is reliably performed above a given brightness. After lighting of the S lamp 27a is inhibited and an AF status flag, which will be described later, is cleared, the CCD line sensor 20 is driven in a subroutine <CCD INTEGRATION> to allow it to perform an integration for range finding. The subroutine <CCD INTEGRATION> will be described later in detail.

After having returned from the <CCD INTEGRATION> routine, the status of an AFENA signal is checked. If the AFENA signal is not at "H", the AF status flag is cleared and the <CCD INTEGRATION> routine is repeated after a REL$_1$ flag, which will be described later, is cleared.

The AF status flag will be now described. The AF status flag is to be set when an automatic focusing is impossible such as when a range difference can not be detected due to poor conditions of an object being photographed or a taking lens can not be moved to its in-focus point in the <RANGE DIFFERENCE CALCULATION> routine. The AF status flag is composed of a low contrast flag which is set when the object is in a low contrast (hereinafter referred to as LC flag) and a low light flag which is set when the object is in a low brightness (hereinafter referred to as LL flag).

The <RANGE FINDING> routine performs an integration of the CCD line sensor and calculations of a range difference of the object and a direction of the range difference. The range difference data are stored in an ERROR register whenever the data are obtained. The <RANGE FINDING> routine has the function of properly changing an integration time in response to a brightness of the object.

The repeated operations of clearing the AF status flag→CCD INTEGRATION checking the AFENA signal clearing REL1 flag are an essential operation of this embodiment. The repeated operations are performed during "a time lag from determination of composition of The object to the half-depression of the shutter release button 37" as mentioned above.

Status of the AFENA signal which represents whether the release button 37 is in a half-depressed condition is constantly observed during the operation of the <CCD INTEGRATION> routine. When the AFENA signal becomes "H" during the CCD integration and at this time integrated data have been stored in the register after a first integration had already been completed, the flow immediately returns from the <CCD INTEGRATION> routine. On the other hand when integrated data are not stored, the flow returns after a first integration is completed.

Upon confirming that the AFENA signal is at "H", the REL1 flag is set and then a range difference is calculated in the subroutine <RANGE DIFFERENCE CALCULATION> to store it in an ERROR register. Checking the LL flag in &he AF status flag, when it is judged to be in a low brightness, the use of the S lamp is allowed to resume the <CCD INTEGRATION> and <RANGE DIFFERENCE CALCULATION>. When it is judged not to be in a low brightness, an LC flag check operation is resumed.

When it is judged to be in a low contrast, in a <LENS SCAN> routine, a taking lens is forcibly moved from a present position through a near position to an infinite position and even during this movement the range finding operation is performed to seek for a position not in a low contrast.

When the position not in a low contrast is found or the lens reaches the infinite position, a motor is stopped and the flow returns from the <LENS SCAN> routine. After having returned, an AFENA signal is checked and when it is at "H", the AF status flag is cleared to resume the range finding operation described above. When the AFENA signal is at "L", the flow returns to the initial condition.

When the result of the range finding shows that a condition is neither in a low brightness nor in a low contrast, an examination of whether the present lens position is focused with reference to an object 0 (FIG. 3) photographed, namely whether a range difference is within tolerance is followed. When it is judged to be not in-focus, the range difference is converted to an amount of target movement of the lens (the number of pulses for movement in a <PULSE CALCULATION> routine. However, a comparison value with which the calculated range difference is compared to examine whether it is within the tolerance for focusing, varies depending upon a fully-open F No. of the lens. Accordingly, in this embodiment, a threshold Eth with an auto-focus accuracy is stored in the lens data circuit 17 arranged in an interchangeable lens so as to read out it when an in-focus condition is examined. Similarly, a lens variable power coefficient for deriving a target movement of the lens from the range difference is also stored in the lens data circuit 17.

When the target movement of the lens is obtained, an examination of whether the present position of the lens at a stop is at a near one is followed. If not, the flow goes to a <MDRIVAF> routine and if at a near position, an examination of whether a direction to be moved is pointed to the near position is performed. If so, the lens, of course, can not move and with a display of being unable to focus the flow goes to an examination of the AFENA signal.

On the other hand, when the lens drive direction is not pointed to the near position, the flow goes to the <MDRIVAF> routine. The <MDRIVAF> routine is a subroutine for moving a taking lens by a given amount in a given direction. When the lens reaches a target position, the flow returns from the <MDRIVAF> routine. In the <MDRIVAF> routine, when the lens reaches the near position and stops, a near end stop flag is set and the flow returns. In addition, the AFENA signal is observed even during the lens driving operation and when the half-depression of the release button is released during the lens driving operation, the flow returns immediately.

Having returned from the <MDRIVAF> routine, the range finding operation is resumed after returning to an operation of clearing the AF status flag. The range finding operation is for confirming an in-focus condition after the lens has been driven and when out-of-the tolerance for focusing the lens drive operation is resumed and the operation loop until an in-focus condition is obtained is repeated. When it is judged to be focused, an in-focus display is made and an EOFAF signal at "H" is successively delivered to the MAINCPU 14 as a signal for allowing a release of the release button. When the automatic focusing operation is completed, the AFENA signal is examined and when it remains at "H" the examination is repeated to assume an AF lock condition. When the AFENA signal becomes "L". the flow returns to its initial condition and goes to the next automatic focusing operation.

Now, operation of the subroutine <CCD INTEGRATION> will be described in detail with reference to a flow chart shown in FIG. 6.

First, the AFCPU 22 sends an integration initiating signal through the interface IC 21 to the CCD line sensor 20 to initiate an integration. Then, a $REL_1$ flag is confirmed. When a first integration is just initiated, the REL1 flag is not set and is at "L". Then, it is examined whether a first integration is in progress. This examination is conducted as to whether integrated data have already been stored in a register of the AFCPU 22 at this time. When the integrated data are not stored and a first integration is operated, completion of the integrating operation and a maximum integration time are subsequently examined. Namely, the above mentioned flow operations are repeated until the first integration is completed or an integration time of the first integration exceeds a maximum time which is set in ITIME. When the integration level reaches a given value, the integration operation is completed and interrupted. A CCD analog output of the CCD line sensor 20 is converted through the interface IC 21 to digital data and is read through the bus line to be stored in a register of the AFCPU 22, followed by returning to the flow shown in FIG. 5. When the integration time exceeds the maximum time which is set in the ITIME while the integration level does not reach the given value because of a low brightness, the integration operation is forcibly interrupted as being incapable of finding a range. At this time, integrated data are similarly stored and the flow returns.

Returning to the flow shown in FIG. 5 after the first <CCD INTEGRATION> is completed, an AFENA signal is checked in the flow as described above and as long as the shutter release button 37 is not half-depressed, the AFENA Signal is at "L" A $REL_1$ flag and AF status flag are cleared to operate the second <CCD INTEGRATION>. In the flow diagram shown in FIG. 6, during the second integration, the AFENA signal is checked. As long as the AFENA signal is at "L", the integration is performed until the integration level reaches a given level or the integration time exceeds the maximum value, as described above. Then, the integration is interrupted and the second integration data are read in to be stored in a register, followed by returning to the flow shown in FIG. 5. Before the release button 37 is half-depressed, the third and the following CCD integrations are performed in a manner similar to the second one. In other words, before the release but&on 37 is half-depressed, the above stated flow operations in the subroutine <CCD INTEGRATION> shown in FIG. 6 are repeated. Consequently, integration data stored in a register of the AFCPU 22 are continuously renewed.

When the release button 37 is half-depressed and the AFENA signal becomes "H" in the course of the above stated flow operations of <CCD INTEGRATION>, the $REL_1$ flag is set without awaiting completion of the integration and the integration is immediately interrupted, followed by returning to the flow shown in FIG. 5. In &he flow shown in FIG. 5 after it is confirmed that the AFENA signal is at "H", the $REL_1$ flag is set to calculate a range difference on the basis of the integration data. The range difference is stored in an ERROR register of the AFCPU 22. The integration data employed in the routine <RANGE DIFFER- ENCE CALCULATION> are the latest one stored in the register in the flow shown in FIG. 6 immediately before the release button 3? is half-depressed.

After returning from the routine <RANGE DIFFERENCE CALCULATION>, upon the range finding, the range difference is converted to the number of pulses for movement and a lens is driven in a direction towards an in-focus point. Thereafter, returning to the operation of clearing the AF status flag the routine <CCD INTEGRATION> is carried out in order to ensure the focused condition after the lens is driven.

Figure 6:
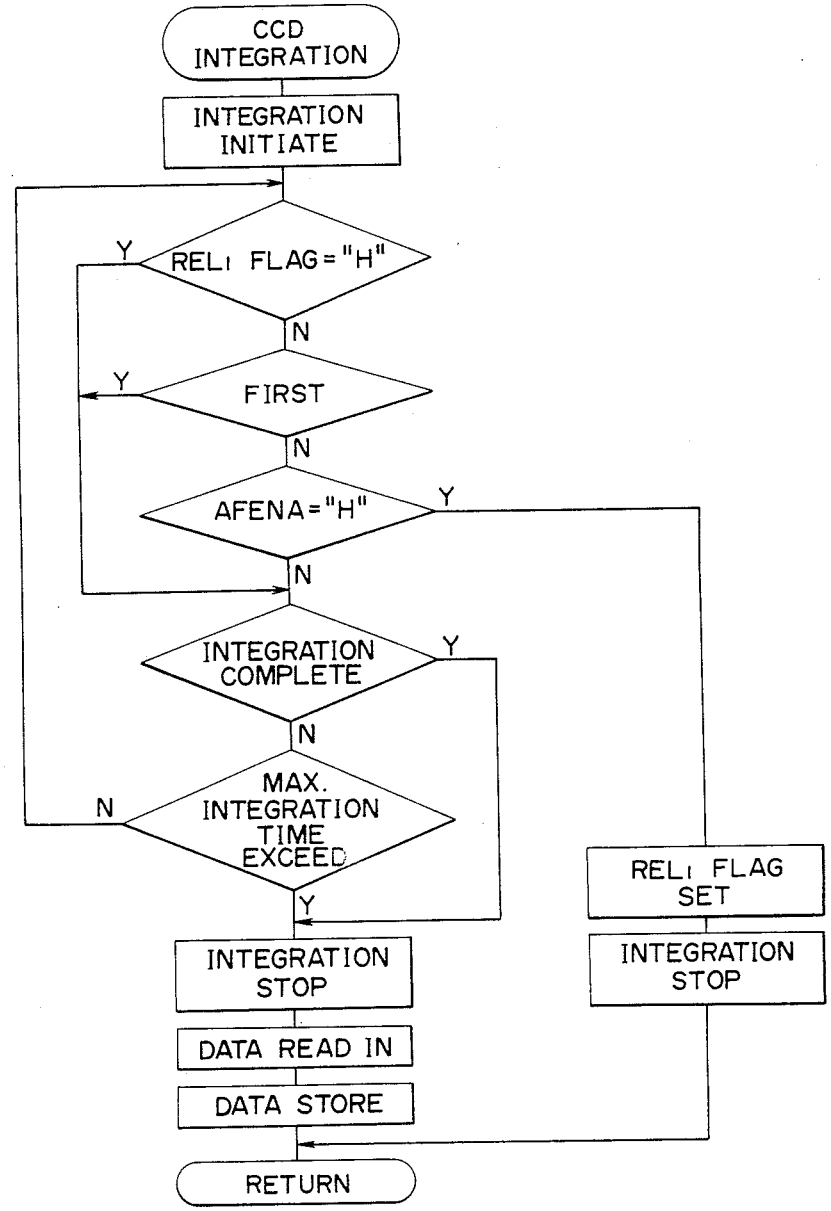
FIG. 6 is a flow chart illustrating operations of the CCD routine shown in FIG. 5.

In the operation of the <CCD INTEGRATION> for confirmation, as is clear from the flow chart shown in FIG. 6, since the $REL_1$ flag is at "H", the integration is continued to complete without checking the AFENA signal after the integration is initiated. Upon completion of the integration, integration data are read in to storage. Accordingly, after returning from the routine <CCD INTEGRATION>, a range difference is calculated on the basis of the stored data and the lens is driven in accordance with the calculated range difference. In other words, the reason of employing the $REL_1$ flag is to prevent the routine <CCD INTEGRATION> from going through without performing the integration when the routine <CCD INTEGRATION> is called while the AFENA signal is at "H".

Figure 7:
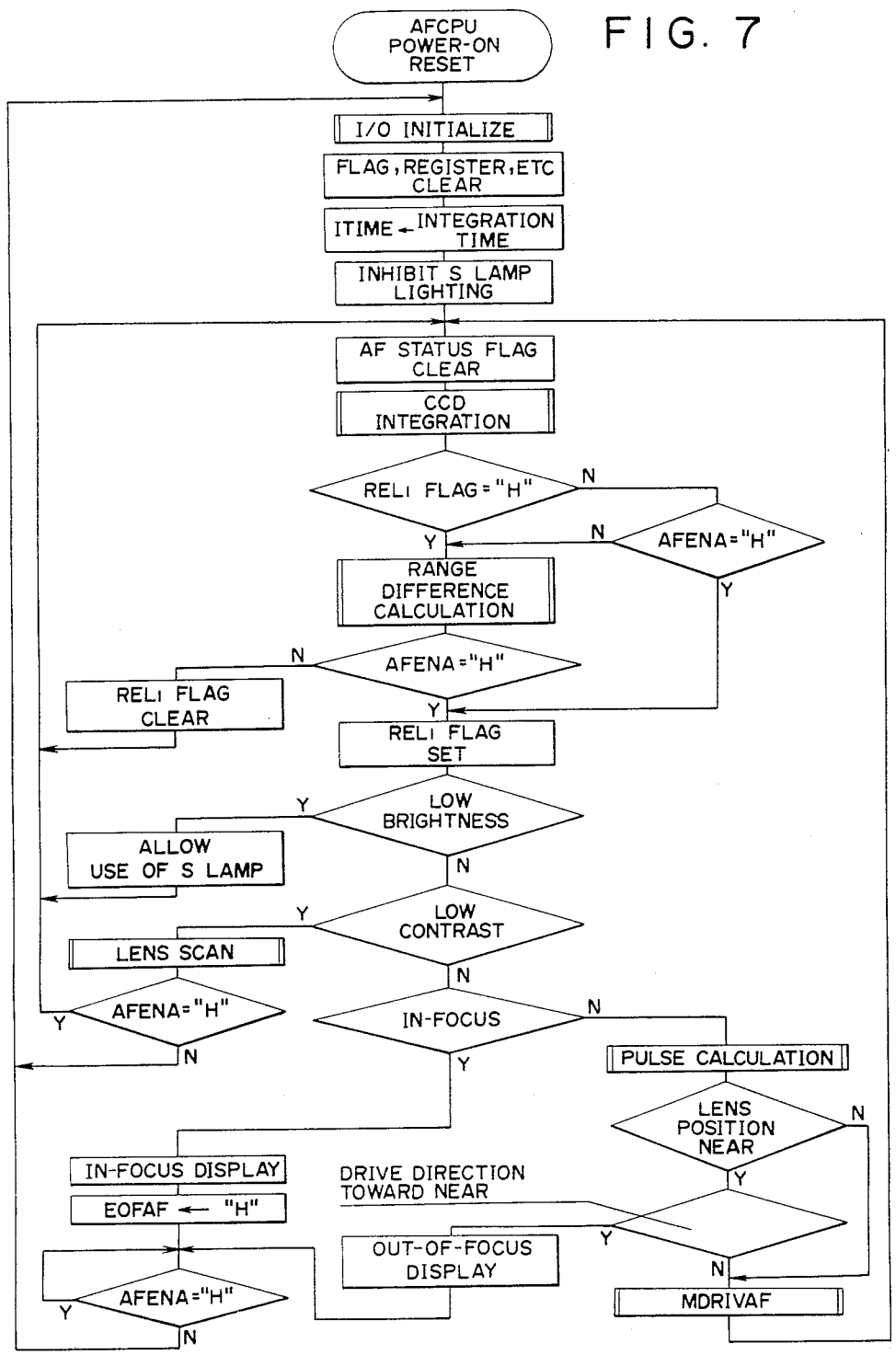
FIG. 7 is a flow chart illustrating another example of the programmed operations of the AFCPU shown in FIG. 3.

FIG. 7 is a flow chart of another programmed operation of the AFCPU 22. While, in the flow chart shown in FIG. 5, the CCD integration is repeated before the release button 37 is half-depressed and the calculation of a range difference and the lens drive are effected on the basis of the latest integration data after the release button 37 is half-depressed, in the flow chart shown in FIG. 7 a CCD integration and calculation of a range difference are effected before the release button 37 is half-depressed and a lens is driven in accordance with the latest calculated data of the range difference after the release button 37 is half-depressed. The flow chart shown in FIG. 7 is further described only regarding distinctions over that shown in FIG. 5.

A sequence of operations as far as the <CCD INTEGRATION> is quite the same as that in FIG. 5. When a first CCD integration is completed and the flow returns from the routine <CCD INTEGRATION>, a $REL_1$ flag is first checked Since the $REL_1$ flag is not initially set, an AFENA signal is subsequently checked. Since the AFENA signal is at "L" as long as the release button 37 is not half-depressed, the routine <RANGE DIFFERENCE CALCULATION> is subsequently operated in accordance with data of the CCD integration and the calculated range difference is stored in the ERROR register. After the range difference is calculated, the AFENA signal is again checked. Since the AFENA signal is at "L", the $REL_1$ flag and AF status flag are cleared and a second CCD integration is initiated. After the second CCD integration, a range difference is similarly calculated on the basis of integration data. The calculated range difference is stored in the ERROR register in place of the previously obtained one. Thus, as long as the release button 37 is not half-depressed, the CCD integration and calculation of a range difference are repeated and calculated data of a range difference are continuously renewed.

After the AFENA signal becomes "H" by half-depressing the release button 37, the $REL_1$ flag is set and whether it is in a low brightness and low contrast is checked.

Thereupon, flow operations similar to those shown in FIG. 5 are effected. On the other hand, the AFENA signal is checked before and after the routine <RANGE DIFFERENCE CALCULATION> and accordingly even when the AFENA signal becomes "H" before a range difference is calculated on the basis of integration data without completion of the CCD integration, the $REL_1$ flag is set without calculating a range difference.

After the $REL_1$ flag is set, when it is in neither a low brightness nor a low contrast and a range difference is beyond a tolerance for focusing, the range difference is converted to the number of pulses in movement to drive a lens. As described in the operations of the flow shown in FIG. 5 even after a lens is driven in the routine <M-DRIVAF>, in order to confirm the focused condition, the AF status flag is cleared and the rang finding operations of the routines <CCD INTEGRATION> and <RANGE DIFFERENCE CALCULATION> are effected. In this range finding operation, since the $REL_1$ flag is already at "H", even when the AFENA signal is at "H", after the CCD integration, a range difference is certainly calculated on the basis of the CCD integration data and a lens is driven in accordance with the range difference.

While the subroutine <PULSE CALCULATION> is operated after judging whether it is in a focused condition in the flow chart shown in FIG. 7, it may be possible that the subroutine <PULSE CALCULATION> is allowed to be carried out immediately after the subroutine <RANGE DIFFERENCE CALCULATION> and while the AFENA signal is at "L" the number of pulses in movement is continuously obtained on the basis of the latest range difference.

Figure 8:
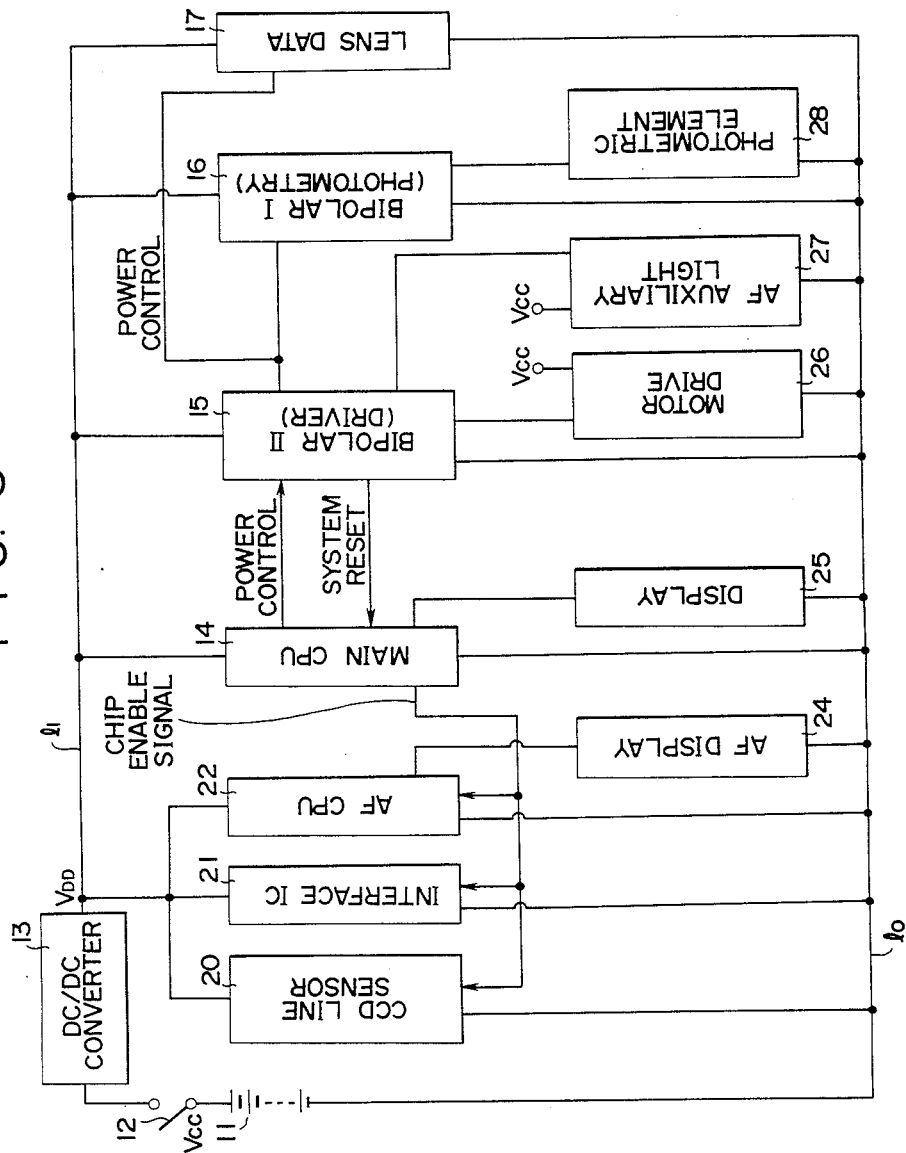
FIG. 8 is a block diagram of an electric circuit including its power supply in another embodiment of an automatic focusing camera according to the present invention.

FIG. 8 is a block diagram of an electric circuit in another embodiment of a camera system to which the present invention is applied. In this embodiment, the transistor 23 for power supply control employed in FIG. 2 is omitted and a voltage VDD is always applied to an automatic focusing circuit comprising a CCD line sensor 20, interface IC 21 and AFCPU 22. Accordingly, operations of the automatic focusing circuit are initiated when a chip enable signal at "L" is delivered from the MAINCPU 14 to each of the CCD line sensor 20, interface IC 21 and AFCPU 22. The AFCPU 22 also initiates the automatic focusing operations a described above by the chip enable signal. Other structures and functions of the circuit shown in FIG. 8 are the same as those shown in FIG. 2.

What is claimed is:

1. An automatic focusing camera comprising:
   range difference detector means for detecting a range difference between an image forming position and a predetermined focusing position of an object being photographed;
   storage means for storing said range difference;
   lens drive means for focusing a taking lens by a motor drive in accordance with the range difference stored in said storage means;
   lens movement monitor means for monitoring movement of the taking lens during the operation of said lens drive means; and
   control means for controlling operations such that, during the period from determination of composition of the object to a half-depression of a shutter release button, said range difference detector means and said storage means are repeatedly operated and, when the release button is half-depressed, the taking lens is driven by said lens drive means in accordance with the range difference obtained immediately before the half-depression and stored in said storage means to stop it at the predetermined focusing position in response to the monitored result of said lens movement monitor means.

2. An automatic focusing camera according to claim 1, further including means for controlling start and stop of the automatic focusing operation by delivering an output in response to the half-depression of the release button.

3. An automatic focusing camera according to claim, further including auto-focus auxiliary light means which is lighted when the object is in a reduced brightness.

4. An automatic focusing camera comprising:
photoelectric transducer means for photoelectrically transforming a light image of an object being photographed;
calculator means for calculating a range difference related to a range to the object by receiving a photoelectrically transformed output from said photoelectric transducer;
storage means for storing said range difference; and
a motor for driving a taking lens in accordance with the range difference stored in said storage means;
said photoelectric transducer means and said calculator means, under activation by supplying power thereto, calculating said range difference and driving said motor in accordance with the latest range difference by operating an operating member.

5. An automatic focusing camera according to claim 4 in which said photoelectric transducer means and said calculator means are further activated when receiving a chip enable signal.

6. An automatic focusing camera according to claim 4 in which said photoelectric transducer means receives an image light of the object being photographed through a taking lens.

7. An automatic focusing camera according to claim 4 in which said operating member comprises a shutter release button of a camera.

8. An automatic focusing camera comprising:
range difference detector means for detecting a range difference between an image forming position and a predetermined focusing position of an object being photographed;
storage means for storing said range difference;
lens drive means for focusing a taking lens by a motor drive in accordance with the range difference stored in said storage means;
auxiliary detector means for supplementing the detecting operation of said range difference detector means;
control means for controlling operations of driving the taking lens by means of said lens drive means in accordance with the latest range difference stored in said storage means immediately after an operating member is operated in the status of said range difference detector means and said storage means being activated by a power supply; and
inhibitor means for inhibiting the operation of said auxiliary detector means before said operating member is operated.

9. An automatic focusing camera according to claim 8 in which
said operating member comprises a shutter release button of a camera.

10. An automatic focusing camera according to claim 8 in which said auxiliary detector means comprises an auxiliary light source which emits light when the object is in a reduced brightness.

11. An automatic focusing camera according to claim 8 in which
said auxiliary detector means scans a taking lens when the object is in a reduced contrast.

12. A method for automatically focusing a camera having a depressible shutter release button, comprising the steps of:
(a) detecting a range difference between an image forming position and a predetermined focusing position of an object being photographed;
(b) storing said range difference;
(c) repeating steps (a) and (b) until a shutter release button is half-depressed; and
(d) controlling driving operations of a taking lens in accordance with the latent range difference when said shutter release button reaches a predetermined position intermediate an undepressed position and a fully depressed position.

13. An automatic focusing camera having an operating member and comprising:
photoelectric transducer means composed of a plurality of minutely divided photosensitive elements and having the function of integrating a photocurrent into which light from an object being photographed is transferred;
means for converting the photocurrent into a digital value;
storage means for receiving an integrated output of each of said photosensitive elements and storing said output after performance of said analog to digital conversion;
calculator means for calculating a range difference related to a range to an object being photographed in accordance with a value stored in said storage means; and
a motor for driving a taking lens in accordance with said range difference;
said photoelectric transducer means and said storage means,
upon activation by a power supply, performing the integration to store an output of the integration and controlling driving of said motor in accordance with the latest stored value in response to operation of said operation member.

14. An automatic focusing camera having an operating member according to claim 13 in which
said operating member comprises a shutter release button of a camera.

15. An automatic focusing camera comprising:
photoelectric transducer means composed of a plurality of minutely divided photosensitive elements and having the function of integrating photocurrent into which light from an object being photographed is transformed;
calculator means for calculating a range difference related to a range to an object being photographed in response to an output integrated by said photoelectric transducer means; and
a motor for deriving a taking lens in accordance with the range difference;
said photoelectric transducer means, upon activation by a power supply, initiating said integrating operation, calculating a range difference on the basis of an integrated value in response to operation of said operating member and controlling said motor in accordance with the range difference.

16. An automatic focusing camera having an operating member comprising:
   photoelectric transducer means composed of a plurality of minutely divided photosensitive elements and having the function of integrating a photocurrent into which light from an object being photographed is transformed;
   calculator means for calculating a range difference related to a range to the object in response to an output integrated by said photoelectric transducer means;
   auxiliary means for supplementing the integrating operation of said photoelectric transducer means;
   lens drive means for driving a taking lens in accordance with a range difference;
   control means for controlling operations of initiating the integration operation in said photoelectric transducer means when supplied with power, calculating a range difference in said calculator means by operation of said operating member and driving the taking lens by said lens drive means, inhibitor means for inhibiting the operation of said auxiliary means before said operating member is operated.

17. An automatic focusing camera according to claim 16 in which
   said auxiliary means comprises an auxiliary light which is emitted when the object is in a reduced brightness.

18. An automatic focusing camera according to claim 16 in which
   said auxiliary means scans the taking lens when the object is in a reduced contrast.

19. A method for automatically focusing a camera having an operating member, comprising the steps of:
   receiving light from an object being photographed on photoelectric transducer means composed of a plurality of minutely divided photosensitive elements and integrating a photocurrent which is photoelectrically transformed in said photoelectric transducer means;
   repeating said integrating operation until said shutter release button is moved to a predetermined half-depressed position;
   calculating a range difference between an image forming position and a predetermined focusing position of an object being photographed in response to the latest integration output when said release button reaches said half-depressed position; and
   controlling driving a taking lens in accordance with said range difference.

20. A method for automatically focusing the taking lens of a camera having a movable operating member comprising the steps of:
   (a) receiving light reflected from an object to be photographed;
   (b) determining from said light a value necessary for bringing the taking lens to an in-focus condition;
   (c) storing the determined value;
   (d) repeating steps (a) through (c); and
   (e) moving the taking lens to a in-focus position as the operating member reaches a predetermined position in moving towards a fully depressed position which latter position initiates a photographing operation.

21. The method of claim 20 further comprising the step of repeating steps (a) through (c) when a low brightness condition is detected.

22. The method of claim 20 further comprising the step of repeating steps (a) through (c) when a low contrast condition is detected.

23. The method of claim 20 further comprising the step of moving the taking lens from its present position to a near position and then to an infinite position responsive to a low contrast condition to seek a lens position not in a low contrast.

24. The method of claim 20 wherein step (a) further comprises the steps of:
   integrating the currents of a plurality of light sensitive elements responsive to the light from said object; and
   halting the integration when the operating member reaches said predetermined position.

25. The method of claim 20 wherein step (a) further comprises the steps of:
   integrating the currents of a plurality of light sensitive elements responsive to light from said object; and
   halting the integration when a maximum integration time is reached even though the operating member has not reached said predetermined position.

26. The method of claim 20 wherein step (a) further comprises the steps of:
   counting the number of times the initiation of the integration is performed; and
   halting the integration when the initiation of the integrate occurs a second time.

* * * * *

UNITED STATES PATENT AND TRADEMARK OFFICE
CERTIFICATE OF CORRECTION

PATENT NO. : 4,816,858

DATED : March 28, 1989

INVENTOR(S) : Youji Watanabe et al.

It is certified that error appears in the above-identified patent and that said Letters Patent is hereby corrected as shown below:

At column 1, line 48, after "hundreds" insert --of milliseconds--

At column 1, line 54, "Camera" should be --camera--

At column 2, line 31, "of" should be --to--

At column 2, line 33, "Of" should be --of--

At column 2, line 40, "CCD" should be -- ⟨CCD⟩ --

At column 3, line 19, after "lens" insert --movement--

At column 3, line 55, after "circuit" insert --24 for display--

At column 4, line 4, before "zoom" insert -- ( --

At column 4, line 29, after "depression" insert -- ) --

At column 4, line 48, "count" should be --counts--

UNITED STATES PATENT AND TRADEMARK OFFICE
CERTIFICATE OF CORRECTION

PATENT NO. : 4,816,858

DATED : March 28, 1989

INVENTOR(S) : Youji Watanabe et al.

It is certified that error appears in the above-identified patent and that said Letters Patent is hereby corrected as shown below:

At column 4, line 52, before "shaped" insert --is--

At column 6, line 39, after "INTEGRATION" insert -- → --

At column 6, line 40, after "signal" insert -- → --

At column 6, line 43, "The" should be --the--

At column 6, line 60, "&he" should be --the--

At column 7, line 16, before "photographed" insert --being--

At column 7, line 20, after "movement" insert -- ) --

At column 8, line 52, "but&on" should be --button--

At column 8, line 63, "&he" should be --the--

At column 9, line 3, "3?" should be --37--

UNITED STATES PATENT AND TRADEMARK OFFICE
CERTIFICATE OF CORRECTION

PATENT NO. : 4,816,858
DATED : March 28, 1989
INVENTOR(S) : Youji Watanabe et al.

It is certified that error appears in the above-identified patent and that said Letters Patent is hereby corrected as shown below:

At column 10, line 17, "rang" should be --range--

At column 10, line 46, "a" should be --as--

At column 11, line 12, after "claim" insert --1--

At column 12, line 19, "latent" should be --latest--

At column 12, line 29, "transferred" should be --transformed--

At column 14, lines 49-50, "integrate" should be --integration--

Signed and Sealed this

Twenty-seventh Day of November, 1990

Attest:

HARRY F. MANBECK, JR.

*Attesting Officer*     Commissioner of Patents and Trademarks